United States Patent [19]

Eller

[11] 4,282,776
[45] Aug. 11, 1981

[54] OVERLOAD PROTECTION FOR TRANSMISSION SYSTEM WITH PLANETARY-GEAR TRAIN

[76] Inventor: Fritz D. Eller, Hellweg 36, 43 Essen 14, Fed. Rep. of Germany

[21] Appl. No.: 25,181

[22] Filed: Mar. 29, 1979

[51] Int. Cl.³ .......................... F16H 1/28; F16H 5/52
[52] U.S. Cl. .................................. 74/801; 74/337
[58] Field of Search ............ 74/801, 337, 335, 752 E

[56] References Cited

U.S. PATENT DOCUMENTS

| | | | |
|---|---|---|---|
| 1,218,236 | 3/1917 | Backscheider | 74/801 X |
| 2,690,685 | 10/1954 | Donandt | 74/801 |
| 2,724,266 | 11/1955 | Baker et al. | 74/801 X |
| 3,435,696 | 4/1969 | Carr | 74/337 X |

FOREIGN PATENT DOCUMENTS 1058060  2/1967  United Kingdom ...................... 74/801

Primary Examiner—James Kee Chi
Attorney, Agent, or Firm—Karl F. Ross

[57] ABSTRACT

The sun gear and the planet carrier of a planetary-gear train are connected with respective shafts, one of them driven and the other coupled with a load, while the ring gear is resiliently anchored to a surrounding housing so as to be rotatable with reference thereto in the event of an overload. Depending on the direction of relative rotation, a control member coupled with the ring gear actuates one of two switches or switch groups to generate an alarm signal or to take corrective action.

12 Claims, 5 Drawing Figures

OVERLOAD PROTECTION FOR TRANSMISSION SYSTEM WITH PLANETARY-GEAR TRAIN

FIELD OF THE INVENTION

My present invention relates to overload protection for a transmission system which includes a planetary-gear train inserted between an input shaft driven by a power source and an output shaft coupled with a load.

BACKGROUND OF THE INVENTION

As is well known in the art, a planetary-gear train comprises a sun gear, a ring gear concentrically surrounding the sun gear, and one or more planet gears meshing with both the sun gear and the ring gear while being mounted on a planet carrier rotatable about the axis of the latter. A desired transmission ratio between an input shaft and an output shaft is obtainable by rigidly coupling these shafts with two of the aforementioned components (sun gear, ring gear and planet carrier) while immobilizing the third component. In the system here particularly considered, the ring gear is held substantially stationary under normal operating conditions while the other components are respectively connected with the two shafts.

When the ring gear is allowed a certain rotational mobility relative to a surrounding housing, as by being linked with that housing through a spring or similar yieldable retaining means, that gear will occupy a predetermined relative position on standstill and during idling but will progressively deviate from that position under increasing load. If the input shaft is connected with the sun gear, the direction of deviation under load will be opposite the sense of rotation of the codirectionally turning shafts; in the event of a negative load, as where the output shaft carries a flywheel and tends to outrun the input shaft during deceleration of the source of driving power, the deviation occurs in the sense of shaft rotation. If the input shaft is connected with the planet carrier, the relative sense of deviation is reversed.

It has already been proposed to provide such a ring gear, engaged by a restoring spring, with a spring-loaded control pin which is radially guided in the housing and is cammed outwardly by a ramp formation on the ring gear when the latter deviates in either direction from its normal position relative to the housing. The control pin then acts upon a switch which signals the existence of an overload by disconnecting the drive motor, braking the load or emitting an alarm indication. The overload signal is the same for either direction of displacement of the ring gear. In practice, however, the corrective measures to be taken may have to be different in the two situations referred to above, i.e. when the output shaft lags the input shaft under load or leads it because of the flywheel effect (with due consideration to the step-down or step-up ratio of the planetary-gear train).

OBJECT OF THE INVENTION

The object of my present invention, therefore, is to provide an improved arrangement of the general type described which distinguishes between the two types of overload occurring with a lagging and with a leading output shaft.

SUMMARY OF THE INVENTION

I realize this object, in accordance with my present invention, by the provision of first and second position-sensing means secured to the planetary-gear housing and juxtaposed with control means entrained by the ring gear for detecting a relative rotation of the latter beyond respective limits on opposite sides of a predetermined or normal relative position. The two position-sensing means respectively control first and second overload-signaling means whose operation, accordingly, depends on the sense of deviation of the ring gear from its normal position against the force of the associated retaining means.

The two position-sensing means may be a pair of switches mechanically actuated by the control means, e.g. by a spring-loaded pin engaging the ring gear. Alternatively, I may use contactless sensors responsive to the displacement of a ferromagnetic element, e.g. a permanent magnet, carried on the ring gear to constitute the aforementioned control means. Each of the position-sensing means may include a group of such sensors in relatively staggered positions, i.e. angularly spaced around the ring-gear axis, so as to detect different degrees of overload; thus, for example, one sensor of either group may alert an operator by a visual or audible signal while another may automatically initiate the corrective measures to be taken. An analogous arrangement could be provided with staggered mechanical switches.

By my present invention I am able not only to distinguish between the two types of overload but also to establish different criteria for them, e.g. to allow for a greater displacement of the ring gear in one direction than in the other (or similar displacements against different restoring forces). Thus, for example, the permissible overload in the forward direction—due to the flywheel effect—may be greater than in the reverse direction—due to excessive load resistance—since the former will usually correct itself after a short while. Such an unsymmetrical arrangement also avoids the danger that, upon momentary disconnection of the drive motor to relieve an overload due to drag, the ring gear may swing out in the opposite direction to a sufficient extent to actuate the other position sensor, thereby operating a load brake.

In many instances the housing of a planetary-gear train is filled with fluid such as a lubricant and should therefore be sealed against leakage. This creates no particular problem in the aforedescribed prior system in which a control pin moves radially in a housing wall. When such a pin is peripherally entrained by the ring gear, however, the sealing of the housing becomes more difficult. This problem can be solved, pursuant to a more particular feature of my invention, by providing the ring gear with a toothed peripheral zone (either on one of its faces or along its circumference) in mesh with a pinion forming part of the control means, the pinion being mounted on a supporting shaft which is journaled in an adjoining housing wall. The selective actuation of the two position sensors can then be performed outside the housing by a member mounted on an external portion of that shaft.

The leakage problem can also be avoided if the assembly of control means and position-sensing means, possibly together with the associated restoring spring or springs acting upon the ring gear, is enclosed within the housing so that only the wires of the sensors lead to the outside.

BRIEF DESCRIPTION OF THE DRAWING

My invention will now be described in greater detail with reference to the accompanying drawing in which.

SPECIFIC DESCRIPTION

Figure 1:
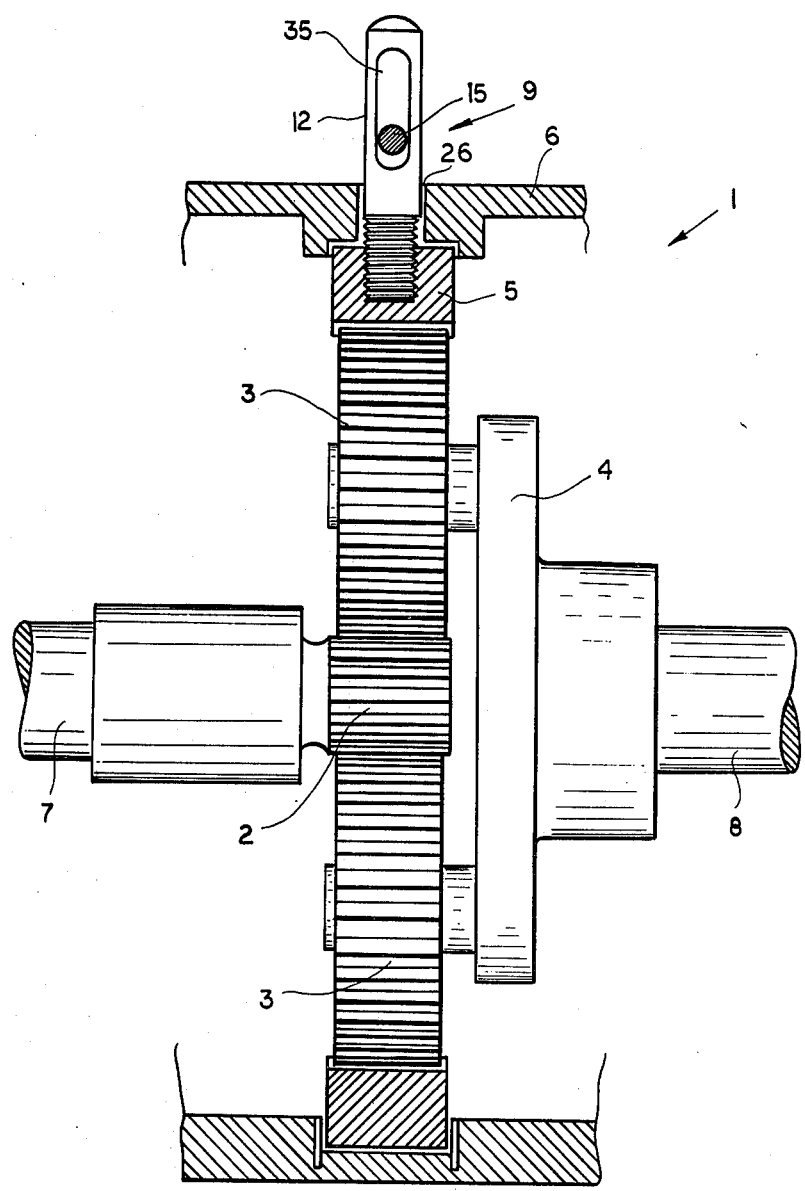
FIG. 1 is an axial sectional view of a planetary-gear train equipped with an overload-protection arrangement according to my invention.

In FIG. 1 I have schematically shown a conventional planetary-gear train 1 comprising a sun gear 2, a ring gear 5 concentric therewith, and a planet carrier 4 rotatable about the axis of gears 2 and 5 which are in mesh with a pair of planet gears 3 supported on that carrier. An input shaft 7, driven from a nonillustrated power source such as an electric motor, is rigidly connected with sun gear 2 whereas planet carrier 4 is similarly connected with an output shaft 8 coupled to a nonillustrated load.

Ring gear 5 is surrounded by a housing 6 having a peripheral slot 26 through which a control pin 12 projects radially from the periphery of ring gear 5 threadedly engaged by that pin. The latter forms part of a protective assembly 9 including a pair of normally open switches 10, 11 (FIG. 2), either of which can be closed by the pin when it swings out beyond a predetermined limit to a respective side from its normal position. Ring gear 5 is biased into this normal position by a pair of springs, such as those shown at 13a, 13b in FIG. 2, wound around a stationary rod 15 which passes with radial clearance through a slot 35 of pin 12 so that this pin may carry out the aforedescribed swinging motion. The planetary-gear train of FIG. 1 has a step-down ratio between shafts 7 and 8 corresponding to the ratio of the pitch radii of gears 2 and 5.

Figure 2:
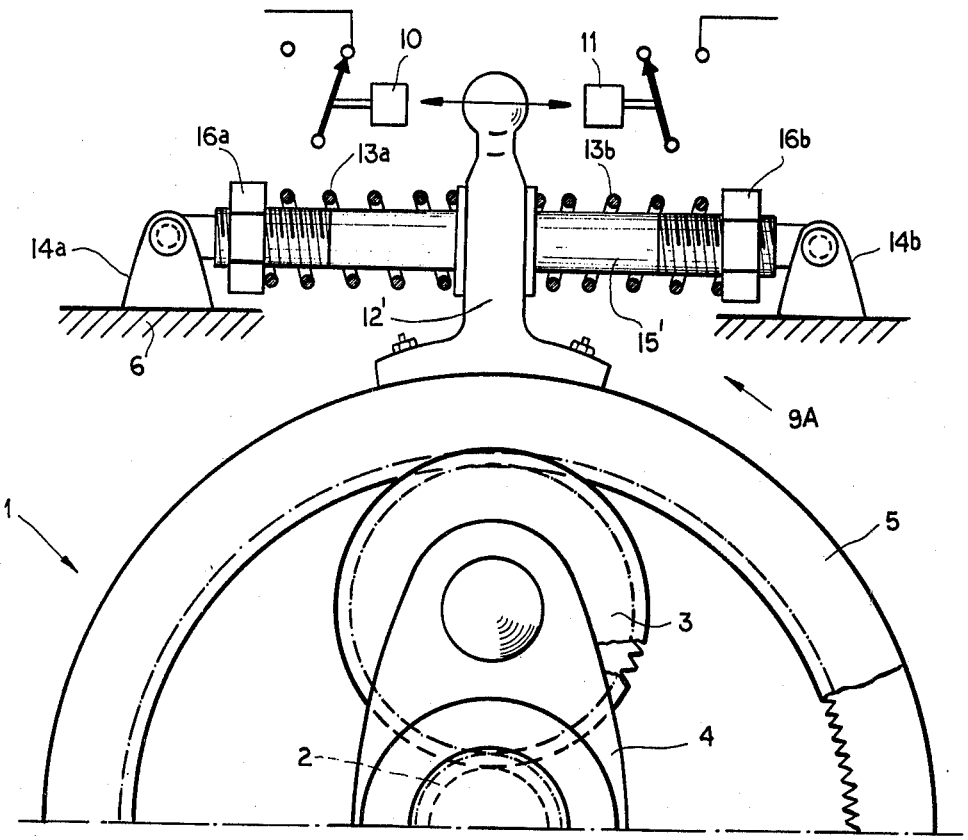
FIGS. 2–5 are face views of such a planetary-gear train, illustrating different protective arrangements according to my invention.

In FIG. 2, where the threaded pin 12 has been replaced by a lug 12' bolted onto the ring gear 5, springs 13a and 13b are shown wound around a rod 15' which freely passes through the lug 12' and has threaded extremities engaged by nuts 16a and 16b. The ends of rod 15' are secured to respective posts 14a, 14b which are rigid with housing 6. Lug 12' is free to swing to either side of its illustrated position, in which it is substantially centered between switches 10 and 11, by virtue of a slot in that lug similar to the one shown at 35 in FIG. 1. The protective assembly of FIG. 2 has been designated 9A.

Nuts 16a and 16b serve to adjust the stress of springs 13a and 13b which could be chosen of lower value in the lagging direction, i.e. counterclockwise with sun gear 2 and planet carrier 4 assumed to turn clockwise, compared with a higher stress in the leading direction (clockwise). Thus, it takes less of an overload to reverse the switch 10 than to do the same with switch 11; switch 10 may interrupt the energizing circuit of the drive motor coupled with input shaft 7 (FIG. 1) whereas switch 11 may close an operating circuit for an electromagnetic brake coupled with the load.

Figure 3:
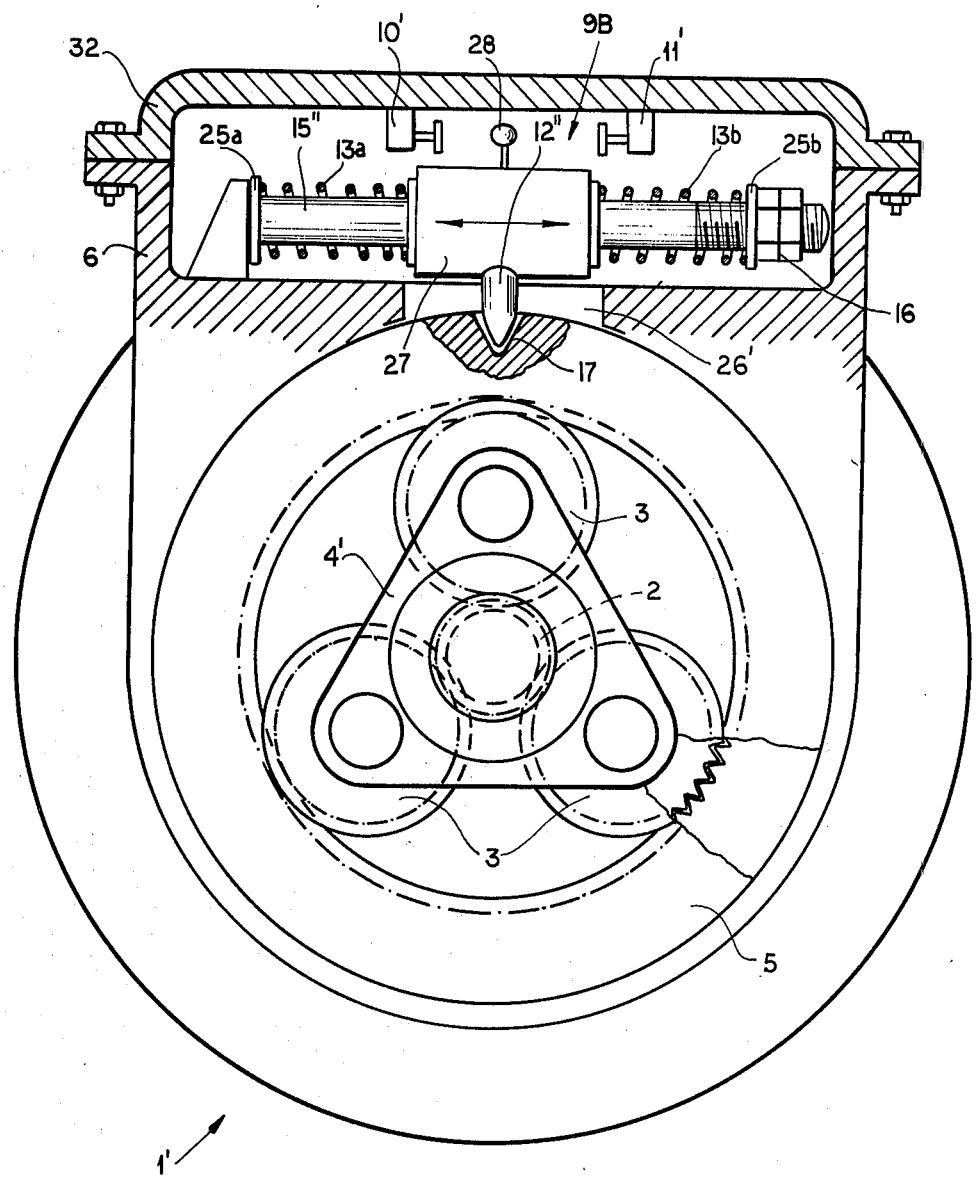

In FIG. 3 I have shown a planetary-gear train 1' which differs from gear train 1 in that its planet carrier 4' supports three planet gears 3 and is of triangular rather than elongate shape. A control pin 12", forming part of a protective assembly 9B, engages in a peripheral recess 17 of ring gear 5 and is secured to a sleeve 27 traversed by a rod 15". This rod is fixedly secured to a lug 25a and has a free threaded extremity engaged by a pair of nuts 16. Springs 13a and 13b surround the rod 15" on opposite sides of sleeve 27.

Pin 12", traversing a housing slot 26', moves tangentially to ring gear 5 so that no radial clearance is required for the sleeve 27 as it slides on the cantilevered rod 15". A knob 28 on the sleeve coacts with two switches 10' and 11' which, in this instance, are shown to be located at different distances from the normal position of the knob. Thus, again, switch 10' can be tripped by a lesser overload than switch 11'.

The assembly 9B is shown enclosed in an extension of housing 6 by means of a cover 32 so that no lubricant or other fluid can leak from that housing.

Figure 4:
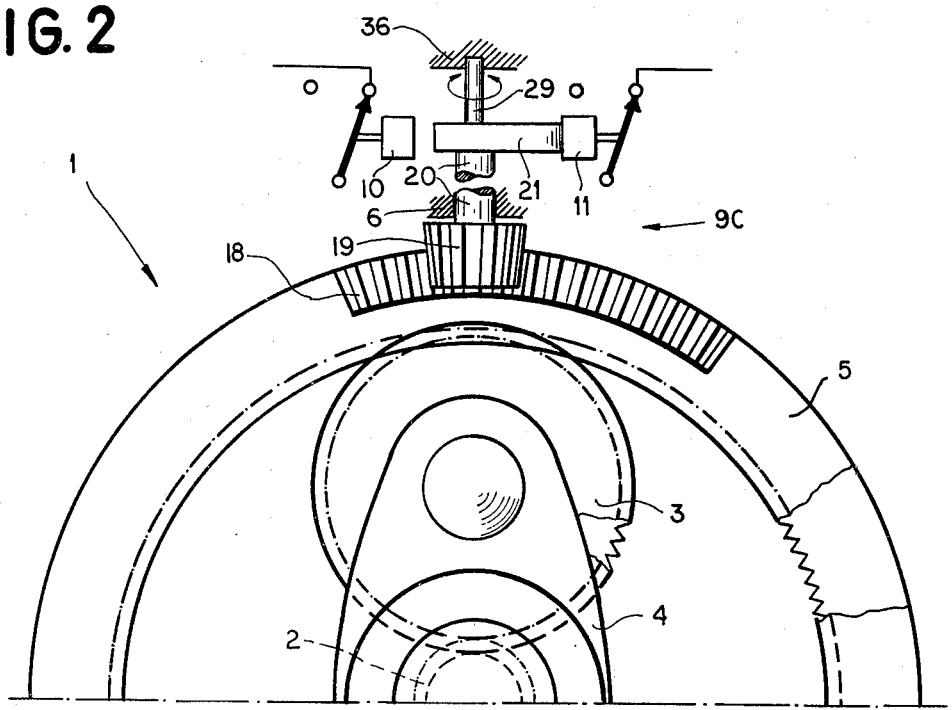

FIG. 4 shows a protective assembly 9C which comprises a pinion 19 in mesh with a toothed arcuate zone 18 on a face of ring gear 5. Pinion 19 is supported on a shaft 20 which is journaled in a substantially leakproof manner in a wall of housing 6 and carries at its free end, beyond that wall, a cam member 21 coacting with switches 10 and 11 in pinion positions 180° apart. Such rotation is resisted by a torsion bar 29 which is fixedly anchored to a bracket 36 and, like the springs of the preceding embodiments, tends to maintain the ring gear 5 in its normal position in which cam 21 engages neither of the two switches. The torsion bar could also be replaced by a spiral spring which contracts when the pinion 19 rotates in one direction and expands when it rotates in the opposite direction, thereby exerting different rotation-opposing torques upon the pinion for the purpose discussed above. In the illustrated position, ring gear 5 has been displaced in a clockwise sense from its normal position to reverse the switch 11.

Figure 5:
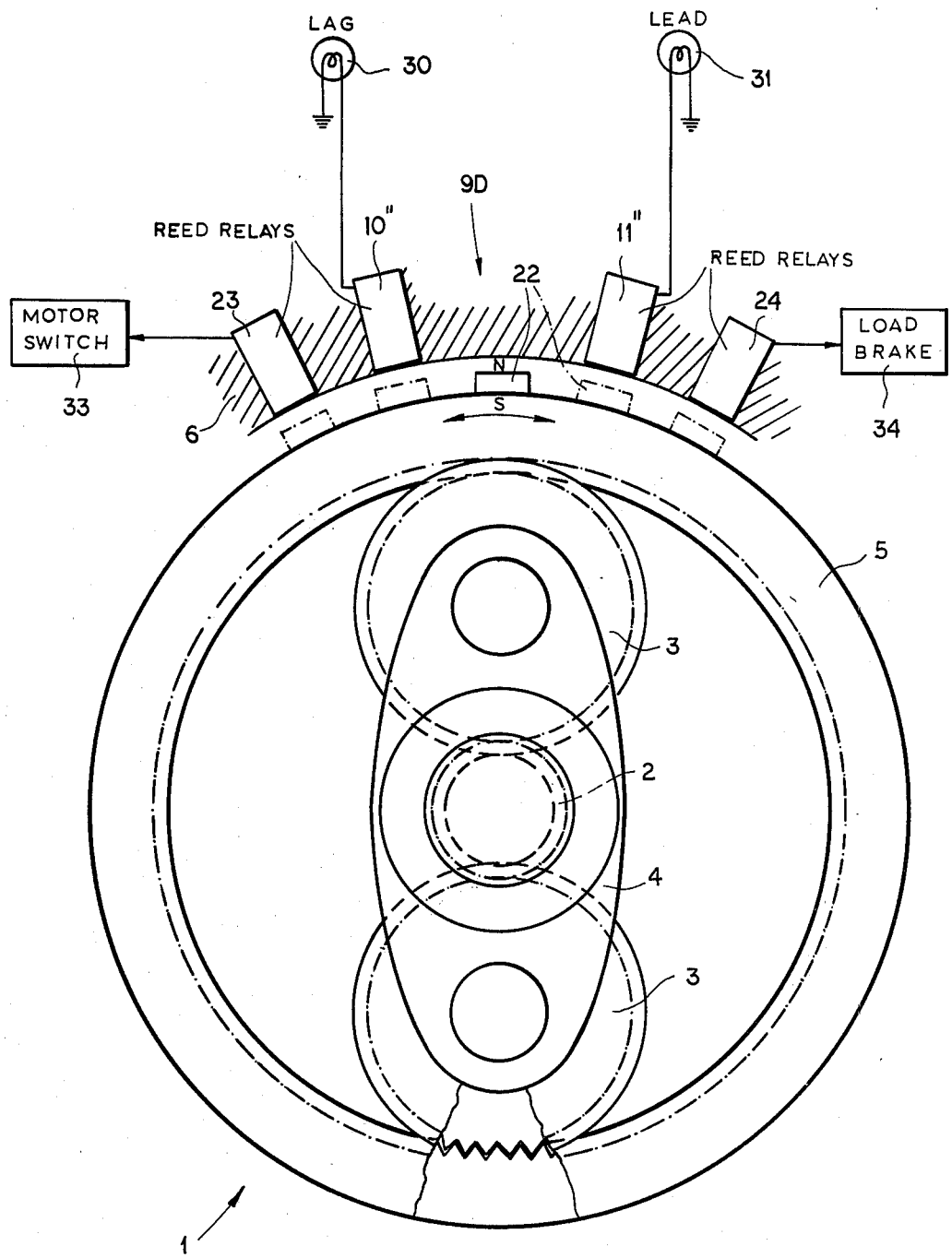

In FIG. 5 the gear train 1 has been shown protected against overload by an assembly 9D comprising a ferromagnetic element 22 on ring gear 5 and two pairs of magnetic sensors 10", 23 and 11", 24 coacting with that element in respective positions thereof illustrated in phantom lines. Sensors 10", 11", 23, 24 may be reed relays closable by the element 22 which in this case is designed as a permanent magnet. It will be understood, however, that this element could also be a passive ferromagnetic projection of ring gear 5 if the sensors generate electromagnetic fields whose lines of force are disturbed by the proximity of that element as is well known per se.

In the specific instance here illustrated, sensor 10" feeds an alarm lamp 30 to indicate a lagging overload whereas sensor 11" feeds a similar lamp 31 indicating a leading overload. The lighting of these lamps occurs when the respective overload is relatively small; its intensification causes sensor 23 or 24 to operate a switch 33 in the motor circuit or a load brake 34 as discussed above. In this instance, too, the protective assembly lies within the housing 6 except for the leads extending to the control devices 30, 31, 33 and 34.

I claim:

1. In a transmission system comprising an input shaft driven by a power source, an output shaft coupled with a load, and a planetary-gear train including a sun gear connected with one of said shafts, a planet carrier connected with the other of said shafts and a ring gear disposed in a stationary housing, the combination therewith of:

yieldable retaining means tending to hold said ring gear in a predetermined position relative to said housing;

control means entrained by said ring gear;

first and second position-sensing means secured to said housing and juxtaposed with said control means for detecting a relative rotation of said ring gear beyond respective limits on opposite sides of said predetermined position; and first and second overload-signaling means respectively controlled by said first and second position-sensing means for indicating the sense of deviation of said ring gear from said predetermined position.

2. The combination defined in claim 1 wherein said control means comprises a member extending radially from said ring gear.

3. The combination defined in claim 2 wherein said retaining means comprises spring means bearing upon said member.

4. The combination defined in claim 3 wherein said spring means comprises a pair of counteracting springs disposed on opposite sides of said member in a plane transverse to the axis of said ring gear.

5. The combination defined in claim 1, 3 or 4 wherein said control means, said retaining means and said position-sensing means are disposed inside said housing.

6. The combination defined in claim 1 wherein said ring gear is provided with a toothed peripheral zone, said control means comprising a pinion meshing with said toothed zone.

7. The combination defined in claim 6 wherein said pinion is provided with a supporting shaft journaled in a wall of said housing in substantially fluidtight manner, said control means further including a member on an external portion of said supporting shaft beyond said wall.

8. The combination defined in claim 1, 3 or 6 wherein said first and second position-sensing means comprise a pair of switches mechanically actuatable by said control means.

9. The combination defined in claim 1 wherein said first and second position-sensing means comprise at least two magnetic sensors, said control means being a ferromagnetic element on said ring gear.

10. The combination defined in claim 9 wherein said ferromagnetic element is a permanent magnet.

11. The combination defined in claim 9 or 10 wherein said first and second position-sensing means each comprise a plurality of magnetic sensors angularly spaced around the axis of said ring gear.

12. The combination defined in claim 4 wherein said retaining means further comprises separate stress-adjusting elements for independently varying the forces of said springs resisting displacement of said ring gear from said predetermined position in respective directions of rotation.

* * * * *